Figure 1:
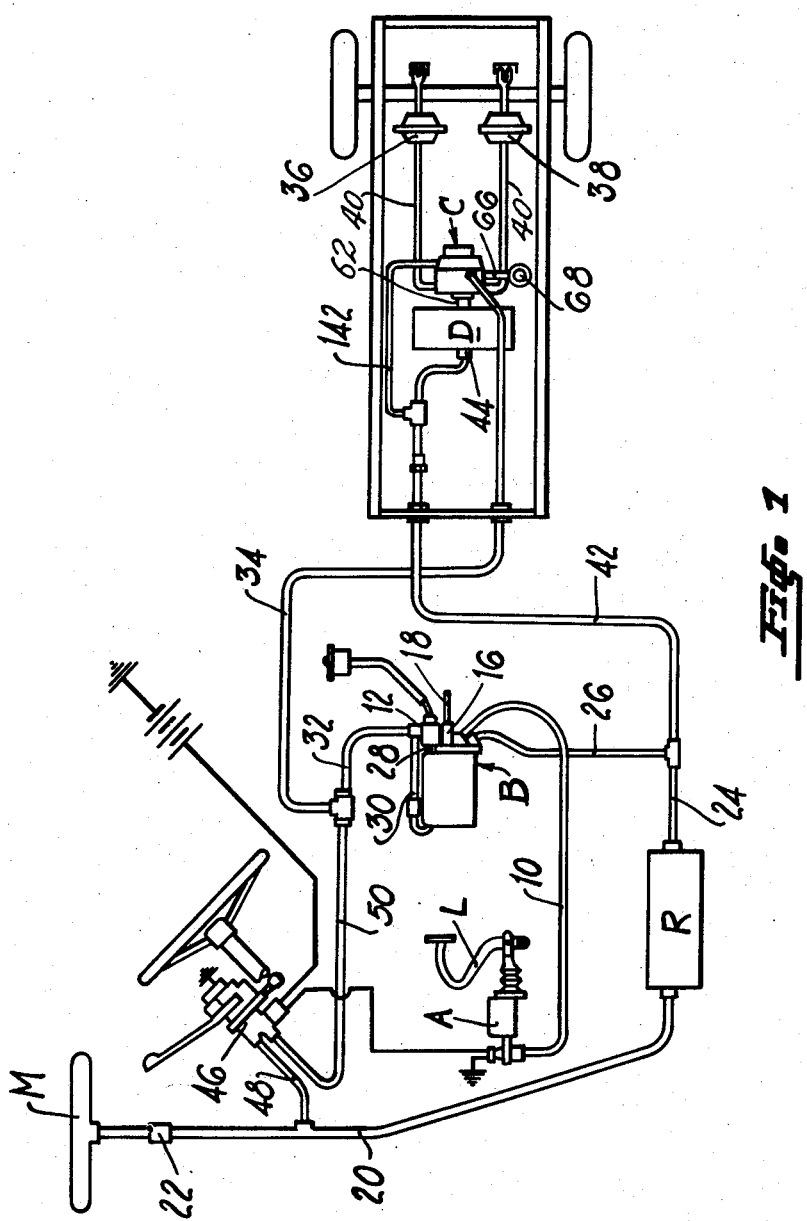

Jan. 27, 1959  J. W. BLAIR ET AL  2,871,065
AUTOMATIC BRAKING DEVICE
Filed Aug. 28, 1956  2 Sheets-Sheet 1

INVENTORS
JOHN W. BLAIR
MAXWELL L. CRIPE
BY-
William P. Hickey
ATTORNEY

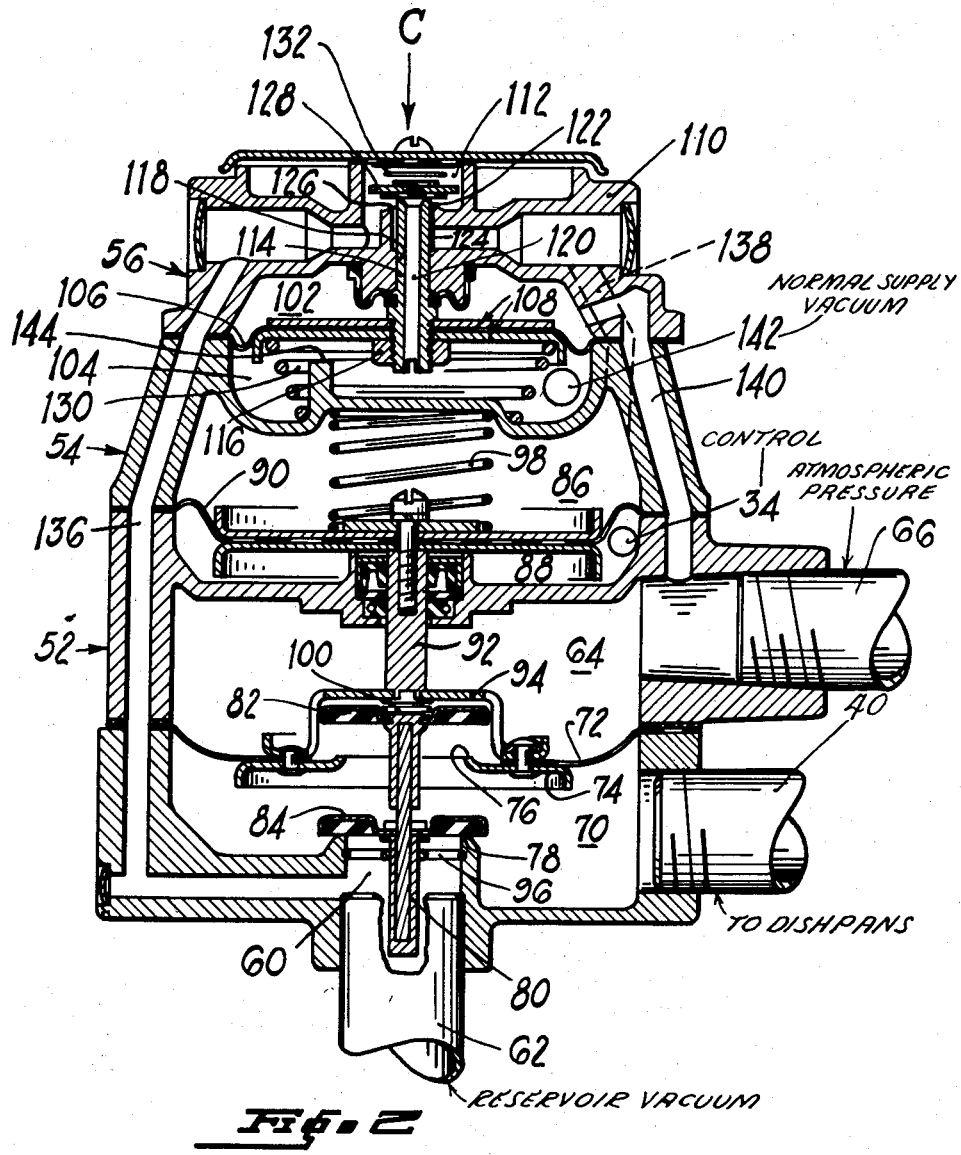

Patented Jan. 27, 1959

2,871,065

AUTOMATIC BRAKING DEVICE

John W. Blair and Maxwell L. Cripe, South Bend, Ind., assignors to Bendix Aviation Corporation, South Bend, Ind., a corporation of Delaware Application August 28, 1956, Serial No. 606,761

5 Claims. (Cl. 303—31)

The present invention relates to pneumatic actuated remote control systems; and more particularly to pneumatically operated tractor-trailer braking systems and to remote control valves therefor.

An object of the present invention is the provision of a new and improved automotive braking system and the like of the type which utilizes a fluid pressure motor for operating a remotely positioned control valve, which motor has a control and opposing pressure chambers both of which are normally submerged with a pressure differing from atmospheric pressure, and which motor is actuated by admitting atmospheric pressure to the control chamber; said system also having an auxiliary supply of said differing pressure and automatic valve means which sequentially closes off communication of the normal pressure supply to said opposing chamber and thereafter communicates said auxiliary supply to said opposing chamber when the pressure differential between the normal supply and atmosphere decreases below a level capable of producing a complete actuation of the control valve.

A further object of the invention is the provision of a new and improved remote control valve having a pneumatic fluid pressure motor therein divided into a control chamber and an opposing chamber by a movable wall operatively connected to valve means which produces a reactive force against the movable wall, which force is generally proportional to the output signal of the control valve, said control and opposing chambers being normally energized with a pressure differing from atmospheric such that the valve means will be automatically operated when atmospheric pressure enters the control chamber, and said control valve also including automatic means for sequentially closing off communication of the normal differing pressure supply to said opposing chamber, and for thereafter introducing an auxiliary supply of said differing pressure to said opposing chamber when the normal supply decreases below a predetermined level.

The invention resides in certain constructions, and combinations and arrangements of parts and further objects and advantages of the invention will be apparent to those skilled in the art to which the invention relates from the following description of the preferred embodiment described with reference to the accompanying drawings forming a part of this specification, and in which:

Figure 1 is a diagrammatic view of an automotive braking system embodying principles of the present invention; and Figure 2 is a cross sectional view of a remote control valve structure shown in Figure 1.

The braking system shown in Figure 1 is a vacuum actuated system for a tractor-trailer combination automotive vehicle. The brakes of the tractor portion of the vehicle are normally actuated by a foot pedal lever operated master cylinder A whose discharge pressure is communicated by means of line 10 to a vacuum actuated fluid pressure servo-motor B. Fluid pressure from line 10 is communicated to the control valve structure 12 integrally mounted on the servo-motor, and adapted to control its operation. The control valve 12 normally supplies vacuum of equal intensity to opposite sides of the servo-motor's power piston; and when called upon by the pressure input signal from the master cylinder A, dumps air pressure upon the back side (i. e. side away from control valve 12) of the servo-motor's power piston. This causes fluid to be displaced under pressure from the hydraulic cylinder 16 of the servo-motor through line 18 which communicates with the front and rear brake applying wheel cylinders (not shown) of the tractor, to actuate the same.

Vacuum for the actuation of the servo-motor B is normally provided by the manifold M of the tractor engine. Manifold vacuum is conducted to a reservoir R by means of vacuum line 20 and check valve 22 adapted to prevent pressure backflow into the reservoir. Vacuum from the reservoir R is in turn conducted to the front side of the power piston of the servo-motor B through vacuum lines 24 and 26. Vacuum admitted to the front side of the power piston is admitted to the control valve 12 through an internal opening 28 in the servo-motor. Control valve 12 is a normally open valve, and therefore vacuum from the front side of the power piston is normally communicated to the back side of the power piston through the valve and its output line 30. The braking system shown in the drawing is adapted to operate the brakes of the trailer simultaneously with those of the tractor and accordingly control valve output pressure from the line 30 is also conducted by means of control lines 32 and 34 to a remotely positioned control structure C mounted on the trailer.

The brakes of the trailer are operated by means of normally atmospheric suspended fluid pressure motors, or dishpans 36 and 38—one for each wheel of the trailer. The control structure C normally communicates atmospheric pressure to the front side of each of the dishpans; and upon receiving the proper signal through line 34, communicates vacuum from a reservoir D mounted on the trailer to the front side of the dishpans 36 and 38, thereby actuating the trailer's brakes. Vacuum for the reservoir D is supplied from the tractor through line 42 and a check valve 44 mounted upon the reservoir and adapted to prevent pressure backflow into the reservoir. A hand control valve 46 is also provided in the system shown in the drawing to permit the trailer brakes to be operated independently of those of the tractor. The hand control valve 46 is a normally open valve adapted to permit vacuum from the reservoir R to normally be communicated with the trailer control line 34 through lines 48 and 50. Upon operation of the hand control valve 46 air pressure is admitted to line 50 and thence through line 34 to operate the brakes of the trailer independently of those of the tractor. For a more complete understanding of the system so far described reference may be had to the Earl R. Price Patent 2,719,609.

The remote control structure C shown in detail in Figure 2 generally comprises a control valve portion 52, operated by means of a fluid pressure motor portion 54, and a sequence valve portion 56 whose function will later be described. The control valve portion 52 comprises a vacuum chamber 60 which communicates with the reservoir D through pipe 62; an atmospheric chamber 64 communicating with the atmosphere through connection 66 and air filter 68; and a control chamber 70 positioned between the atmospheric and vacuum chambers and communicating with the dishpans 36 and 38 through lines 40. The atmospheric and control chambers are separated by means of a diaphragm 72 having a centrally located opening therein, which opening is surrounded by an annular plate 74 riveted to the diaphragm to provide an atmospheric valve seat 76. The vacuum chamber 60 opens directly into the control chamber 70 and is surrounded by a vacuum valve seat 78 positioned generally in line with the atmospheric valve seat 76. Control of air flow between the chambers is accomplished by means of a spool shaped poppet closure member 80 having flange portions 82 and 84 in the atmospheric and control chambers 64 and 70 respectively. Flanges 82 and 84 are adapted to abut the atmospheric and vacuum valve seats 76 and 78, respectively, and so control the operation of the dishpans 36 and 38.

The spool shaped poppet member 80 is adapted to be moved by means of the fluid pressure motor portion 54. The fluid pressure motor portion 54 comprises a pair of opposing chambers 86 and 88 separated by means of a movable wall or diaphragm 90, which diaphragm is connected to the annular plate 74 by means of a shaft or pull rod 92 and spider 94. The spider 94 surrounds the flange 82 of the poppet member to act as a guide therefor, and the lower portion of the poppet member 80 is centered in the vacuum chamber 60 by means of a coil spring 96. A coil spring 98 is positioned in the opposed chamber 86 to bias the diaphragm 90 downwardly and another coil spring 100 is interposed between the spider 94 and the top flange 82 of the poppet member to normally urge the poppet member into engagement with the vacuum valve seat 78.

Control vacuum from the tractor portion of the vehicle is conducted to the opposed chamber 88 by means of the control line 34. During the non-braking condition of the system, control valve 46 is wide open to supply manifold vacuum (service vacuum) to the control line 34. During the non-braking condition of the control structure C, vacuum valve 128 is off of its seat 126 to supply manifold to the opposing chamber 86 such that in the released condition of the trailer brakes manifold vacuum exists in both chambers 86 and 88. When vacuum of substantially equal intensity exists in the opposing chambers 86 and 88 coil spring 98 forces the poppet member 80 downwardly sealing off vacuum flow from reservoir D to the control chamber 70, and admitting atmospheric pressure thereto from the atmospheric valve chamber 64. When atmospheric pressure is admitted to the control line 34, upon actuation of control valve 46, or pedal lever L pressure build-up in the opposing chamber 88 forces the diaphragm member 90 upwardly to compress spring 98, and at the same time moves the annular plate 74 attached to the diaphragm 72 into engagement with the top flange 82 of the poppet member 80. Abutment of the atmospheric valve seat 76 with the flange 82 closes off further atmospheric communication between the atmospheric chamber 64 and the control chamber 70, and continued upward movement of the diaphragm 70 thereafter lifts the lower flange 84 of the poppet member out of engagement with the vacuum valve seat 78. Vacuum is thereupon communicated to the dishpans 36 and 38 to actuate the brakes of the trailer.

It will be seen that vacuum build-up in the control chamber 70 produces a differential pressure across the diaphragm 72, inasmuch as the chamber 64 is always in communication with atmospheric pressure. Vacuum build-up in the chamber 70, therefore, produces a reaction on the diaphragm 72 in a downward direction to oppose the upward valve actuating movement supplied by the diaphragm 90. It will be apparent, therefore, that for any given pressure differential across the diaphragm 90, a corresponding pressure of a proportional intensity will be produced in the control chamber 70 of the control valve structure 52.

One disadvantage of systems of the general type so far described is that small leaks anywhere in the system tend to raise the pressure in the opposing chambers 86 and 88 by equal amounts inasmuch as the control valves in the tractor portion of the vehicle are normally open valves. The systems so far described therefore do not detect failures of this type, and when full atmospheric pressure is communicated to the opposing chamber 88 at some subsequent time, sufficient vacuum will not exist in the opposing chamber 86 to provide a complete application of the trailer's brakes.

The sequence valve portion 56 of the control structure C is adapted to normally communicate service vacuum from the line 42 to the opposing chamber 86 until such time as vacuum in this line has depleted to the point where it no longer can produce a complete application of the trailer's brakes. When this point is reached, the sequence valve portion 56 automatically closes off communication of the normal vacuum service line 42 with the opposing chamber 86 and thereafter admits vacuum of a higher intensity from the reservoir D to the opposing chamber 86 so as to make possible a complete application of the trailer's brakes. The sequence valve portion 56 is designed in such a way that at no time will the normal service vacuum line 42 be communicated with the reservoir D, thereby avoiding possible depletion of the higher vacuum reservoir D by the service vacuum system.

The sequence valve portion 56 comprises a pair of opposing chambers 102 and 104 separated by means of movable wall or diaphragm 106. The center portion of the diaphragm 106 is stiffened by means of a pair of annular plates 108—one being positioned on either side of the diaphragm. The casting 110 from which the sequence valve portion 56 is housed is provided with an auxiliary vacuum chamber 112 positioned to the upper side of the opposing chambers 102 and 104. Communication between the auxiliary vacuum chamber 112 and the lower opposing chamber 104 is provided by means of a tubular valve member 114 the lower end of which projects through the diaphragm 106 and is clamped to the pair of annular plates 108 by a shoulder and nut arrangement 116. The upper end of the tubular valve member 114 projects through a suitable opening 118 in the internal wall 120 into the auxiliary vacuum chamber 112 where the end of the tubular member is provided with a service vacuum valve seat 122. The end of the opening 118 adjacent the auxiliary vacuum chamber 112 is counterbored slightly to provide a control chamber 124 which surrounds the upper portion of the tubular valve member 114. An annular valve seat 126 surrounds the end of the counterbore, and a single poppet member 128 is positioned over both of the valve seats 122 and 126 so as to be able to abut both seats simultaneously. The diaphragm 106, and in turn the tubular valve member 114 is biased upwardly by a coil spring 130 and the poppet member 128 is biased downwardly against the seats by another coil spring 132. The sequence valve portion 56 is completed by a cup shaped rubber seal positioned between the tubular valve member 114 and the internal wall 120 to prevent communication between the chamber 102 and 124; and suitable air passages which will now be described. Vacuum from the reservoir D is communicated to the auxiliary vacuum chamber 112 by means of a passageway 136; control chamber 124 is communicated with the opposing chamber 86 of the fluid pressure motor portion 54 by means of the passageway 138; and atmospheric pressure from the air filter 68 is communicated to the opposing chamber 102 of the sequence valve structure 56 by means of the passageway 140. Service vacuum from the trailer service supply line 42 is continually supplied the opposing chamber 104 by means of the branch line 142.

During the normal non-braking condition of the system, both the trailer control and supply lines 34 and 42 respectively will be supplied with a vacuum of sufficient intensity to completely operate the trailer's brakes. During such condition this vacuum will be supplied to the opposing chamber 104 of the sequence valve structure through connection 142 such that atmospheric pressure in the opposing chamber 102 holds the diaphragm 106 downwardly into engagement with stop 144 and compressing spring 130. With the diaphragm 106 in its lower position, poppet member 128 will be seated upon the annular valve seat 126, and the end of the tubular valve member 114 will be held downwardly out of engagement with the poppet member 128. In this condition service vacuum from the opposing chamber 104 will be communicated with the control chamber 124, and thence through passageway 138 to the opposing chamber 86 of the fluid pressure motor portion 54 of the structure. If, however, the service vacuum from the service vacuum supply line 42 decreases below a predetermined amount, there will no longer be sufficient vacuum in the opposing chamber 104 to permit atmospheric pressure on the top side of the diaphragm 106 to continue to compress the coil spring 130. Decrease in the differential pressure across diaphragm 106 therefore permits the coil spring 130 to force the diaphragm 106 and in turn the tubular valve member 114 upwardly. Upward movement of the tubular valve member 114 causes its upper end to abut the poppet member 128 closing off further communication between the service vacuum in chamber 104 with the control chamber 124; and continued upward movement of the tubular member causes the poppet member 128 to be lifted upwardly out of engagement with the annular valve seat 126, to assume a position corresponding to that shown in Figure 2. In this position the auxiliary vacuum from the reservoir D is communicated with control chamber 124 and thence through passageway 138 to the opposing chamber 86 of the fluid pressure motor 54. It will be remembered that the control line 34 normally is provided with a vacuum of equal intensity to that existing in the service line 42, and that therefore the control vacuum existing in the opposing chamber 88 of the fluid pressure motor 54 is of less intensity then the auxiliary vacuum now being supplied its opposing chamber 86. The difference in vacuums existing on opposite sides of the diaphragm 90, therefore, causes the diaphragm 90 to be moved upwardly causing vacuum from the reservoir D to be communicated with the brake applying dishpans 36 and 38, as has been previously described. It will also be remembered that any given amount of pressure differential across the diaphragm 90 produces a proportional increase in vacuum in the valve's control chamber 70, by reason of the opposing forces upon diaphragm 72, thereby resulting in braking effort of a proportional intensity. Since under such conditions a partial vacuum would still exist in the opposing chamber 88 only a partial application of the vehicle brakes will be obtained at this time. If the driver after noticing that his brakes have been partially applied, desires to completely apply the trailer's brakes, he may do so by either depressing the foot pedal lever L or may operate the hand control valve 46 to dump full atmospheric pressure into the opposing chamber 88 through the control line 34. Either of these valves then supplies sufficient differential pressure across the diaphragm 90 to cause the control valve 52 to communicate full auxiliary vacuum from the reservoir D with the dishpans 36 and 38, thereby providing a complete application of the brakes of the trailer.

It will be apparent that the objects heretofore enumerated as well as others have been accomplished, and that there has been provided a new and improved remote control structure particularly adaptable for vacuum actuated automotive braking systems and which will guard against all types of vacuum failure in its control system.

While the preferred embodiment has been shown and described in considerable detail, the invention is not limited to the particular construction shown or described and it is my intention to cover hereby all adaptations, modifications and uses thereof which come within the practice of those skilled in the art to which the invention relates.

We claim:

1. In a pneumatic control system for an automotive braking system and the like: a fluid pressure motor actuated by the application of a pressure differing from atmosphere; a normal but fluctuable source of said pressure differing from atmosphere; a reservoir supplied by said fluctuable source of said pressure differing from atmosphere; check valve means interpositioned between said reservoir and said source for closing off communication therebetween when the intensity of said source falls below that existing in said reservoir; a control valve having a movable element which opens and closes communication between said reservoir and said fluid pressure motor; a fluid pressure actuated control motor having a movable wall therein which operates said movable element of said valve and which movable wall separates opposing chambers in said motor; a control line communicating with one of said opposing chambers; a normal supply line for communicating the other of said opposing chambers with said source; said control fluid pressure motor being arranged to cause said movable element to close communication between said reservoir and said first mentioned fluid pressure motor when pressures of substantially equal intensities exist in said opposing chambers, and to cause said movable element to open communication between said reservoir and said first mentioned fluid pressure motor when atmospheric pressure is bled into said one opposing chamber and said differing pressure exists in said opposing chamber; and valve means for communicating said normal supply line to said other opposing chamber when the differential pressure between said normal supply line and atmosphere exceeds a predetermined amount, and for communicating said reservoir to said other opposing chamber when said differential pressure is below said predetermined amount, said valve means being so constructed and arranged as to sequentially close off communication between said normal supply line and said other opposing chamber, and thereafter open communication between said reservoir and said other opposing chamber when said differential pressure falls below said predetermined amount, whereby depletion of said reservoir to said supply line is prevented.

2. In a pneumatic control system for an automotive braking system and the like: a fluid pressure motor actuated by the application of a pressure differing from atmosphere; a normal but fluctuable source of said pressure differing from atmosphere; a reservoir supplied by said fluctuable source of said pressure differing from atmosphere; check valve means interpositioned between said reservoir and said source for closing off communication therebetween when the intensity of said source falls below that existing in said reservoir; a control valve having a movable element which opens and closes communication between said reservoir and said fluid pressure motor; a fluid pressure actuated control motor having a movable wall therein which operates said movable element of said valve and which movable wall separates opposing chambers in said motor; a control line communicating with one of said opposing chambers; a normal supply line for communicating the other of said opposing chambers with said source; said control fluid pressure motor being arranged to cause said movable element to close communication between said reservoir and said first mentioned fluid pressure motor when pressures of substantially equal intensities exist in said opposing chambers, and to cause said movable element to open communication between said reservoir and said first mentioned fluid pressure motor when atmospheric pressure is bled into said one opposing chamber and said differing pressure exists in said opposing chamber; valve means adapted to alternatively connect said normal supply line and said reservoir to said other opposing chamber without at any time communicating said reservoir with said supply line; and a fluid pressure motor utilizing the pressure differential between said normal supply line and the atmosphere for actuating said valve means, said fluid pressure motor causing said valve means to communicate said reservoir to said other opposing chamber when the vacuum in said supply line decreases below a predetermined level.

3. In a remote control valve for an automotive braking system and the like: a valve body having a fluid pressure motor chamber therein; a movable wall separating said chamber into a control and an opposing chamber; said movable wall being operatively connected to control valve means for governing the operation of a controlled device, and which valve means provides a reaction to said movable wall which is generally proportional to the force developed by the controlled device when being actuated by said control valve; means for communicating a control pressure signal to said control chamber which control signal is normally of a pressure differing from atmospheric and which control signal approaches atmospheric pressure to cause activation of the controlled device; means for communicating a fluctuable source of a pressure differing from atmosphere to said opposing chamber, which fluctuable source has a normal intensity generally corresponding to the normal intensity of said control signal; and means for sequentially closing off communication between said fluctuable source and said opposing chamber, and thereafter communicating an auxiliary source of said differing pressure to said opposing chamber when the differential pressure between said fluctuable source and atmosphere falls below a predetermined level.

4. In a remote control valve for an automotive braking system and the like: a valve body having a fluid pressure motor chamber therein; a movable wall separating said chamber into a control and an opposing chamber; said movable wall being operatively connected to control valve means for governing the operation of a controlled device, and which valve means provides a reaction to said movable wall which is generally proportional to the force developed by the controlled device when being actuated by said control valve; means for communicating a control pressure signal to said control chamber which control signal is normally below atmospheric pressure and which control signal approaches atmospheric pressure to cause activation of the controlled device; means for communicating a fluctuable source of vacuum to said opposing chamber, which fluctuable source has a normal intensity generally corresponding to the normal intensity of said control signal; and means for sequentially closing off communication between said fluctuable source and said opposing chamber, and thereafter communicating an auxiliary vacuum source to said opposing chamber when the differential pressure between said fluctuable vacuum source and atmosphere falls below a predetermined level.

5. In a remote control valve for automotive braking systems and the like: a valve body member having nine axially spaced pressure chambers; first, second and third movable walls separating the first and second, third and fourth, and fifth and sixth chambers respectfully; flow passage means for communicating said first and ninth chambers, said fifth and eighth chambers, and said sixth and eighth chambers; first and second valve seats between said first and second, and second and third chambers respectively, each facing toward said second movable wall, said second valve seat being carried by said first movable wall; a first valve closure member actuable by said second movable wall and having spaced valve closure portions for abutment wtih said first and second valve seats; first spring means biasing said second movable wall toward said first and second valve seats; a third valve port between said eighth and ninth chambers; valve means actuated by said third movable wall for successively closing off said passage means between said sixth and eighth chambers and thereafter opening said third valve port when said third movable wall moves toward said ninth chamber; second spring means biasing said third movable wall toward said ninth chamber; an auxiliary vacuum supply port for said first chamber; a valve output port for said second chamber; an atmospheric pressure port for said third and seventh chambers; an input pressure signal port in said fourth chamber; and a normal vacuum supply port for said sixth chamber; whereby normal vacuum from said sixth chamber is normally supplied to said fifth chamber when it differs from atmospheric pressure by a predetermined amount, and auxiliary vacuum is supplied said fifth chamber when said normal vacuum falls below said predetermined amount to establish auxiliary vacuum input signal pressure differential across said second movable wall to close said second valve port and open said first valve port if the input signal vacuum is less than said auxiliary vacuum.

References Cited in the file of this patent

UNITED STATES PATENTS

| | | |
|---|---|---|
| 2,429,196 | Price | Oct. 14, 1947 |
| 2,645,308 | Fitch et al. | July 14, 1953 |
| 2,719,609 | Price | Oct. 4, 1955 |

UNITED STATES PATENT OFFICE
CERTIFICATE OF CORRECTION

Patent No. 2,871,065                                                    January 27, 1959

John W. Blair et al.

It is hereby certified that error appears in the printed specification of above numbered patent requiring correction and that the said Letters Patent should read as corrected below.

Column 3, line 31, strike out "vacuum" and insert the same after "manifold", in line 32, same column; column 8, line 16, for "wtih" read -- with --.

Signed and sealed this 7th day of July 1959.

(SEAL)

Attest:
KARL H. AXLINE

Attesting Officer

ROBERT C. WATSON
Commissioner of Patents